June 2, 1942.                M. P. WINTHER                2,285,246
                    ELECTRICAL CONTROL APPARATUS
                 Filed March 19, 1941        2 Sheets-Sheet 1

June 2, 1942.  M. P. WINTHER  2,285,246
ELECTRICAL CONTROL APPARATUS
Filed March 19, 1941   2 Sheets-Sheet 2
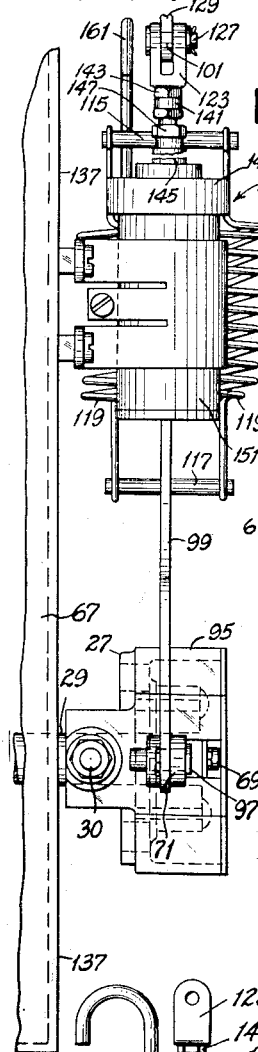
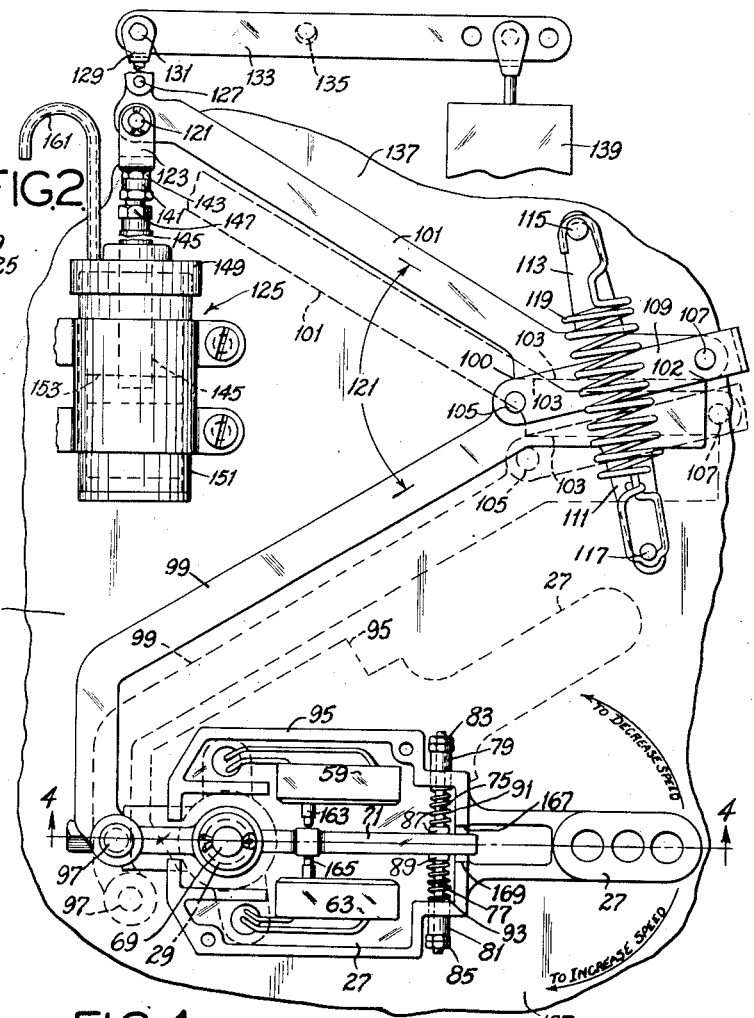
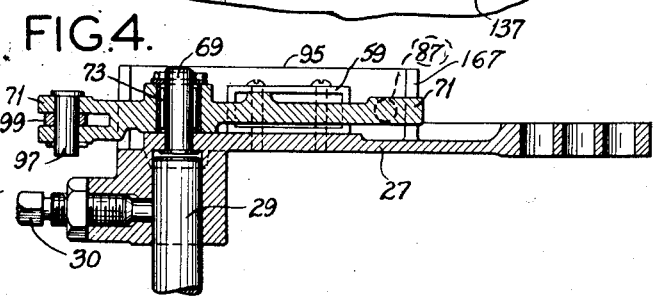
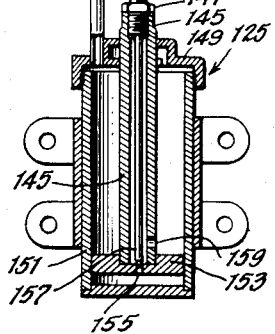
Martin P. Winther,
Inventor.
Haynes and Koenig,
Attorneys.

Patented June 2, 1942

2,285,246

UNITED STATES PATENT OFFICE 2,285,246

ELECTRICAL CONTROL APPARATUS

Martin P. Winther, Waukegan, Ill., assignor to Martin P. Winther, as trustee

Application March 19, 1941, Serial No. 384,217

11 Claims. (Cl. 172—284)

This invention relates to electrical control apparatus, and with regard to certain more specific features to control apparatus for eddy-current slip clutches and the like.

Among the several objects of the invention may be noted the provision of means for obtaining more accurate governing of the speed of a slip-clutch driven member in response to a given setting of a field rheostat, whether the rheostat is manually controlled, or controlled by incipient speed changes of the driven member of an eddy-current clutch for the purpose of substantially constant-speed operation; the provision of apparatus of the class described which eliminates the errors that have heretofore been introduced by hysteresis effects in the magnetic materials of the eddy-current clutch, particularly if it has a substantial mass of magnetic material, as is usual; and the provision of apparatus of the class described which is simple and reliable. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Fig. 1 is a mechanical and wiring diagram;

Fig. 2 is a side elevation of certain control parts;

Fig. 3 is a left elevation of Fig. 2;

Fig. 4 is a horizontal section taken on line 4—4 of Fig. 2; and,

Fig. 5 is an enlarged vertical detail section of a dash-pot, also shown on Figs. 2 and 3 but with its piston in mid position.

Similar reference characters indicate corresponding parts throughout the several views of the drawings.

Figure 1:
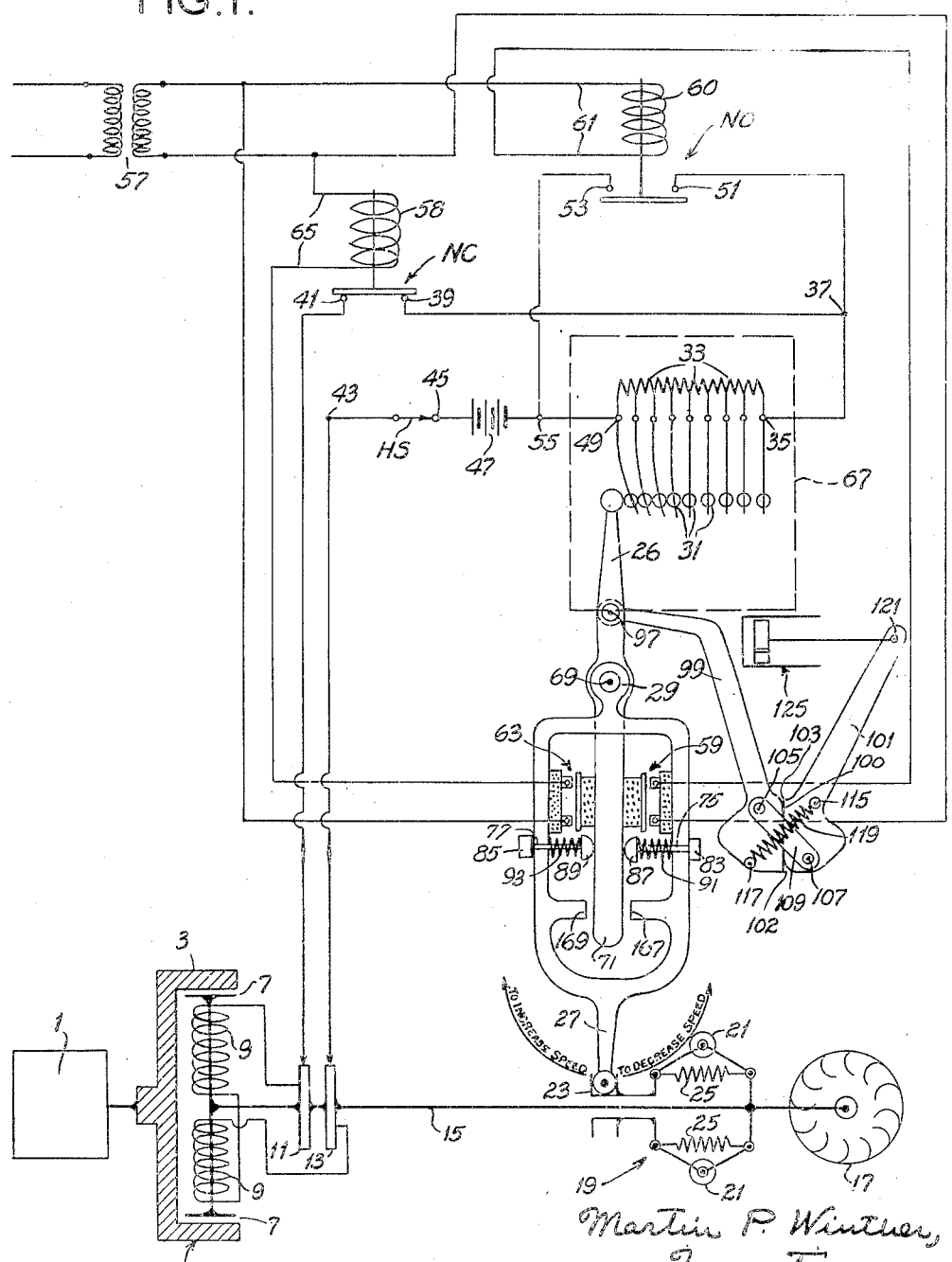

In an eddy-current clutch, which is excited by direct current, and in cases where the speed of the eddy-current clutch must be closely regulated by a rheostat and must be held to the same value at the same corresponding rheostat position, it has been found, particularly where iron masses are of substantial sizes, that the hysteresis of the iron has caused a difficulty in accurately adjusting the speed in relation to rheostat position. Thus, for example, if a rheostat at a given position establishes a current of, say, 5 amperes in the excitation of a large clutch, and the speed has just been reduced from higher speed to 80% of that higher speed, then on returning to the given position from some lower speed, a current of 5 amperes will not result in 80% speed but it may result in only 60% speed.

This discrepancy is explainable by the supposition that the orientation of the molecules in the iron masses requires expenditure of energy, and the same value of current will not set up the same flux values if the current has been progressively reduced to said value instead of progressively increased to said value, and vice-versa. Although the rheostat has returned to the same setting and the amperes flowing are the same, the flux set up is not the same and therefore the torque transmitted by the clutch, and hence the speed developed by the driven member of the clutch will not be the same in the case of variable torque loads. This applies for example particularly to drives for fans where the torque varies as the square of the speed.

The invention corrects for the lag in the magnetization of the iron by correcting for hysteresis. This is accomplished by violently jolting or jarring the molecules in the iron by suddenly temporarily over or under exciting considerably in excess or in deficiency of the value desired, the excess or deficiency being applied momentarily as the rheostat moves to its desired position. By means of this device, over excitation is temporarily and suddenly applied as the current is being built up so as to jar the molecules into a final orientation which is desired for the constant value of current desired, and on the other hand, when the current is decreased the excitation is suddenly temporarily decreased below the desired value as the current is being reduced. In this way, the flux values finally set up by the current corresponding to any definite rheostat position are the same each time the rheostat travels to the same position, regardless of which way it approaches that position. In other words, this method eliminates the effect on speed of the hysteresis loop of the iron.

Under the old conditions, the speed discrepancies and torque discrepancies could be plotted out in a loop which would be similar to the hysteresis loop, and the present invention may therefore be said to eliminate what may be called a speed or torque loop in plots of speed or torque against rheostat setting or current values.

United States Patents 1,982,461, dated November 27, 1934, and 2,050,479, dated August 11, 1936, describe constructions wherein a power driving element is coupled to a driven element through an eddy-current slip clutch, the field windings of the clutch being energized from an electric circuit including a rheostat consisting of a stepped series of resistances and parallel stepped contacts respectively. These contacts are successively closed and opened by a speed-responsive mechanism which in response to incipient increase in speed of the driven member tends to open the contacts serially, thus inserting resistance into the circuit step-by-step and reducing the field current and thus the flux interlinkage between the driving and driven elements. This results in preventing further speed increase. Also, upon incipient decrease in speed, said speed-responsive mechanism tends serially to close said contacts, so as to short circuit the resistances step-by-step. Hence resistance is taken out of the circuit, whereupon the field coil is increasingly energized to increase the flux connection between the driving and driven elements so as incipiently to increase the speed.

Fig. 3 of Patent 2,050,479, particularly, shows the above-mentioned construction in its essentials. It is quite useful, but the present invention improves it by eliminating the conditions of driven-element speed lag referred to rheostat position or current. It is to be understood however that the present invention is applicable also to hand-controlled rheostats by substituting manual control for speed-responsive control.

Referring now more particularly to Fig. 1 herein, there is shown at numeral 1 a driving motor for the eddy-current inductor drum 3 of an electro-magnetic slip clutch C. This clutch has magnetic poles 7 upon its driven member 15. On the poles are field windings 9 energized from slip rings 11 and 13. The driven element 15, in the present example, is shown as driving a blower fan 17 which by way of example may be for combustion control purposes. A speed-responsive governor is shown generally and diagrammatically at 19, arranged so that its fly weights 21, upon increase in speed of the driven member 15, draw over a yoke 23 against the action of springs 25 so as to move a lever arm 27 on a control shaft 29. When the speed of the driven member 15 incipiently increases, the yoke 23 is pulled to the right to move the lever arm 27 counterclockwise. This causes step-by-step opening of spring mounted contacts 31 which are connected in parallel with a series of resistances 33, so that said resistances 33 are successively introduced into the circuit which energizes coils 9. The energizing circuit referred to runs from point 35 through point 37, points 39 and 41 of a normally closed make-and-break relay switch NC, slip ring 11, coils 9, slip ring 13, points 43 and 45 of a hand switch HS, battery 47, point 49, and then through such of the resistances 33 as are not short circuited by contacts 31.

When the speed of the driven member 15 incipiently decreases, the same circuit is traversed by the current, except more of the resistances 33 are short circuited by more of the contacts 31 in response to movement of the collar 23 to the left, and clockwise rotation of the lever 27. It should here be pointed out that the showing of the operating connection or lever 26 between shaft 29 and the contacts 31 is diagrammatic, and that in practice it may be any applicable linkage, such as, for example, the linkages in U. S. Patent 1,982,461 or 2,220,007, or others.

From point 37 is a connection to a point 51 of a normally open make-and-break relay switch NO. The other point 53 of said switch NO connects with point 49 via point 55. Thus it will be seen that the normally open switch NO is in parallel across the resistances 33 and when the switch NO is closed these resistances are short circuited. Such a condition suddenly places the full energizing current on the coils 9. On the other hand, if the relay switch NC is opened, then the circuit to the coils 9 is completely and suddenly deenergized. If desired, a relatively large resistance could be connected across points 39, 41 so that the resistance upon opening switch NC would not be infinite.

The relay switches NC and NO have their operating coils 58 and 60 energized from a transformer 57. An acceleration switch 59 which is normally spring-opened, controls the circuit 61 which energizes the coil of the relay switch NO. A normally spring-opened switch 63 controls the circuit 65 which energizes the coil of the relay switch NC.

The switches 59 and 63 are under control of the motion of the lever 27. While lever 27 has been diagrammed only broadly in Fig. 1, it is actually as shown in detail in Figs. 2, 3 and 4. It functions, not only to operate shaft 29, but also switches 59 and 63, which are mounted thereon, as will appear.

Referring to Figs. 2-5, the rheostat control lever 27 controls the shaft 29 which in turn controls suitable contacts in control box 67. The shaft 29 is shown in Figs. 2-4, and also lever 27, but the linkage corresponding to item 26 in Fig. 1 is within control box 67 and further description is unnecessary.

As shown in Figs. 2-4, lever 27 is fastened to the shaft 29 by set screw 30. Concentric with the shaft 29 and extending from the lever 27, and rotary therewith, is a pin 69. This supports an independently rotary lever 71 on bearings 73. Bearings 73 assure free relative movement.

At 75 and 77 are shown two pins which slide through lugs 79 and 81, respectively, on the lever 27. These pins have adjustable heads 83 and 85, respectively. These heads are arranged in connection with the lugs 79 and 81 so that opposite heads 87 and 89, respectively, on the pins 75 and 77 will be flush against opposite sides of a lever 71. This is when compression springs 91 and 93, respectively, are extended. Thus there is a resilient driving connection between the lever 27 and the lever 71, through spring-pressed pins 75 and 77. Limiting stops 167 and 169 prevent excessive spring deflection.

The lever 71 (pivoted on 69) is used to close the normally open switches 59 and 63 by relative lagging movement with respect to the lever 27 when the latter starts to move. This is done by carrying the switches 59 and 63 in an extended box portion 95 attached to the control lever 27. The cover of this box is shown as being removed, for clarity. The switches 59 and 63 are of the variety called micro-switches. These are characterized by a bias to one position or another and in this case each biases toward open position by suitable internal spring means. These are also characterized by closing snap action in response to a very minute application of operating movement to their operating elements. Their bias opening action is also of the snap variety. Since such switches are known, further details are not necessary.

Thus, when the arm 27, in response to undesired speed increase, moves to the right in Fig. 1 (up in Fig. 2), a speed-decrease correction is desired. This occurs by reason of the opening of the contacts 31 which introduces into the exciting circuit for 9, the desired amount of increased resistance 33 to correct the speed increase. In other words, the clutch coupling slips more. However, since the initial movement or acceleration of the lever 27 (up in Fig. 2) is relative to stationary lever 71, the latter is engaged by the button 165 of the micro-switch 63 temporarily to close that normally open switch. This temporarily opens the normally closed relay switch NC and the exciting circuit for the coils 9. After the lever 27 reaches its adjusted position, spring 93 (which has been compressed) pushes the previously lagging lever 71 into the center position with respect to arm 27, whereupon the micro-switch 63 returns to its normally open condition. This permits the switch NC to reclose, whereupon the circuit will be excited according to the amount of newly adjusted resistance 33. If this results in eliminating the overspeeding further action is unnecessary, but if not, the same sequence of events may occur again, or several times before constant conditions result.

Conversely, if the arm 27 moves to the left in Fig. 1 (down in Fig. 2) in response to speed decrease, requiring speed increase correction, the contacts 31 are increasingly closed in order to short out increasing amounts of resistance 33. This increases the excitation of the coils 9 for tightening the clutch connection, which causes pick-up of speed of the driven member 15. As the lever 27 (Fig. 2) moves down the lever 71 lags temporarily to become engaged by the button 163 of the upper micro-switch 59. Micro-switch 59 temporarily closes normally open relay switch NO. This temporarily short-circuits all of the resistances 33 to give a sudden high degree of excitation to the coils 9. When lever 27 stops the spring 91 causes follow-up of lever 71 and reopening of switches 59 and NO, whereupon the circuit will be excited according to the amount of newly adjusted resistance 33. If this results in eliminating the underspeeding further action is unnecessary, but if not, the same sequence of events may occur again, or several times before constant conditions result.

Over-excitation or under-excitation, as the case may be, of the coils 9 is only temporary and in the nature of a current for violently jarring the molecules of the iron. Hence the molecules take up ultimately desired adjusted positions corresponding to a given current, instead of different positions which depend upon whether the adjusted degree of magnetization was arrived at from higher or lower values.

Referring now to the resiliently coupled damping mechanism coupled with lever 71 (Figs. 2-4), the left-hand end of the lever 71 is pivoted at 97 to a link 99 which has a contact engagement with a link 101 at flat pads 103. The links 99 and 101 are pinned at 105 and 107, respectively, to a bridle link 109. This forms a double-rocking hinge between 99 and 101. When 99 raises it rocks temporarily on 101 at heel 100, provided resistance occurs at 121, where link 101 is resiliently held, as will appear. When 99 descends rocking is temporarily at heel 102. Link 99 has an extension 111 and link 101 has an extension 113. These extensions 111 and 113 have extension pins 115 and 117, respectively, between which react springs 119 for the purpose of biasing the links 99 and 101 together at the pad portions 103.

Thus upon lowering or raising 99, the angle 121 may be resiliently increased or decreased but tends under non-moving conditions to maintain the value shown, in view of the springs 119.

The upper outer end of the link 101 is pivoted at 121 to a clevis 123 of a dash-pot arrangement shown generally at 125 (detailed in Fig. 5 with its piston down). Link 101 is also pinned at 127 to a link 129 which is pinned at 131 to a rocker 133. The rocker 133 is pinned at 135 to the enclosure 137 for the rheostat and associated parts. The right-hand end of the rocker 133 carries a counterbalance 139 so that the net weight of the connecting parts between the lower and upper pins 97 and 121 will not be applied to rotating the lever 71. That is to say the lever 71 is to maintain a neutral position and to move only in response to motion of the lever 27.

The clevis 123 is threaded on a head 141 and locked there by a nut 143. The head 141 is adjustably threaded into a hollow piston rod 145 and is held in any adjusted position by a jam nut 147.

The hollow piston rod 145 reaches through a head 149 into a stationary dash-pot cylinder 151 which is also fastened to the side of the box 137. At its inner end, the piston rod 145 carries a piston 153 which has an opening 155 therethrough controlled by a needle valve 157. The needle valve extends from the adjustable head 141 and may be externally adjusted. An opening 159 in the hollow piston rod 145 permits intercommunication between the opposite sides of the piston 153, under control of the needle valve 157. A breather tube is shown at 161. In operation the cylinder 151 is filled to its designed capacity with dash-pot oil, and any motion up or down of the piston rod encounters the damping resistance of flow through the openings 155 and 159, as throttled by the needle valve 157.

Operation of the linkage between the lever 71 and the dash-pot is as follows:

When the lever 71 is rotated clockwise, the pin 97 is driven toward the pin 127. This tends temporarily to angle together the links 99 and 101 by rocking on heel 100 and by rotation of link 99 on pin 105. This scissors action is against the action of springs 119. Then the springs 119 tend again to angle the links 99 and 101 back to angle 121 with pads 103 flush. Reaction for the purpose comes from spring 91 acting on lever 71. This necessitates rising action of the pin 127 against resistance of the dash-pot 125. The dash-pot slowly permits the action of springs 119 to proceed until the angle 121 is again assumed in a new and lifted position of both links 99 and 101.

On the other hand, if the lever 71 is rotated counterclockwise, the pin 97 moves downward away from the pin 121, thus depressing the link 99 so that the link 101 first rotates on pin 107 and heel 102, temporarily to increase the angle 121 against the pull of springs 119. Then the dash-pot permits the pin 121 to proceed down by the action of springs 119 in bringing together the links 99 and 101 to the angle 121 shown. Spring 93 provides the reaction.

In Fig. 2, a dotted-line alternate position of parts indicates an extreme limiting counter-clockwise condition of the lever 71 and the solid lines a mid position or parts. It is to be understood that the parts are in static, and not moving, condition, both in the solid- and dotted-line positions, and also that the mid position of the piston 153 in Figs. 2 and 3 corresponds to the solid-line, mid positions of the parts exterior to the cylinder 151.

The balanced scissors linkage attached to lever 71 at 97, and attached to the dash-pot at 127, provides damping effects for lever 71. Since the lever 27, through spring-pressed pins 91 and 93 causes rotation of the lever 71, the relative motion between these levers upon movement of 27 causes temporary closing of one or the other of the normally open switches 59 or 63, depending upon the direction of rotation.

Complete operation is as follows:

Assume first that for some reason, as by unloading, the driven member 15 of the clutch C accelerates. This will cause the centrifugal governor to move the lever 27 to the right in Fig. 1, which means up in Fig. 2. The lever 71 lags and instantaneously, by relative motion, closes the normally open lower micro-switch 63. This instantaneously operates the normally closed relay switch NC to open. For an instant the coils 9 are deenergized, thus instantly demagnetizing the poles 7 and eddy-current member 3 before remagnetization at the desired adjusted lower value. At this time, links 99 and 101 raise while angle 121 temporarily reduces due to temporary delaying action of the dash-pot 125. Spring 93 reopens switch 63.

On the other hand, should the governor in response to speed decrease rotate the lever 27 to the left (clockwise) in Fig. 1 and down in Fig. 2, then the lag of the lever 71 would be taken up by the spring 91 and the switch 59 would temporarily instantaneously close to instantaneously close the normally open relay switch NO. This temporarily short circuits the resistances 33 so as to energize the coils 9 to a maximum, after which the spring 91 resets the lever 71 on center with respect to the lever 27. This reopens the switch 59 and also switch NO, whereupon the magnetizing current falls off, thus permitting the magnetization to come down to the value desired from an upper value.

In view of the above, it will be seen that, whenever it is desired to adjust speed by decreasing magnetization, the first thing that occurs is to cut off the magnetization altogether under practically open-circuit conditions, and then to adjust magnetization to the proper value; whereas if it is desired to increase the speed, this is done by first instantaneously magnetizing to the maximum, under practically short-circuit conditions, and then adjusting the magnetization to the desired value.

It should be noted that the degree of adjusting motion of the lever 27 for the above purpose is small as an adjustment is consummated, and that the large throw which is indicated for this lever is for the purpose of providing a wide range of positions at which the action described may take place. The device has the same characteristics at whatever speed the governor is controlling. It will of course be understood that the speed at which control is effected for the driven member 15 may be changed by adjustment of the governor springs. This needs not to be gone into herein because means for adjusting such springs are known.

For best results the temporary over or under excitation should be considerably in excess or deficiency of the final value of exciting current desired, and the temporary values should be quickly and suddenly increased and decreased. Thus the short circuiting of resistances 33 by switch NO provides an instantaneous rush of a substantially higher current to the full extent of which the battery 47 is capable (in view of its line resistance) without resistances 33. Also, the opening of switch NC inserts a very high resistance to flow of current. The nature of the result in the magnetic members is strongly to reorient the magnetic properties of the device.

It is preferable that the springs 91 and 93 be pre-compressed when the heads 87 and 89 are in proper position against the lever 71, so that an effective force is obtained from the springs 91 and 93 for assuring final setting of the linkage between points 97 and 121 into its position for angle 121 shown, whenever an adjustment is made. Ultimate limit stops 167 and 169 between the lever 71 and the lever 27 limit the amount of compression that may be placed in the springs 91 and 93 respectively.

In view of the above, it will be seen that the invention consists of the rheostat 67 which, through a suitable linkage, operates with the control lever 27, there being a lost-motion connection between the control lever 27 and the contact or switch lever 71 which, upon movement of the control lever 27, results in temporarily closing one or the other of the switches 59 or 63; together with damping means 125 and a resilient connection between the damping means 125 and the contact lever 71.

In the above disclosure, the theory of operation is presented with the understanding that other theories may be applicable. In any event, the structure brings about the ultimate ends desired.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In an eddy-current clutch, an eddy-current member, a magnetic field member cooperating therewith, means for exciting said field member comprising an electric circuit, a rheostat for controlling said circuit and consequently the excitation of the field member, and means responsive to adjusting movement of the rheostat for temporarily reducing the value of current in said circuit below the requirement at the final position of the rheostat when the rheostat is adjusted for field decrease, and for temporarily increasing the current above the requirement at the final adjusted position of the rheostat when it is adjusted for speed increase.

2. In apparatus of the class described, a field member, a circuit for exciting said field member, a rheostat controlling circuit resistance to control the excitation by said circuit, make-and-break switches respectively in series and parallel with the rheostat, means for moving the rheostat comprising a control member, a switch-operating means having lost motion engagement with said control member and operating the switches, the switch in series responding to lost motion in one direction substantially to increase resistance in the circuit beyond that which normal adjustment of the rheostat accomplishes in adding resistance to the circuit, and the switch in parallel responding to lost motion in the opposite direction substantially to decrease resistance in the circuit below that which normal adjustment of the rheostat accomplishes in subtracting resistance from the circuit.

3. In apparatus of the class described, a field member, a circuit for exciting said field member, a rheostat controlling circuit resistance to control the excitation by said circuit, make-and-break switches respectively in series and parallel with the rheostat, means for moving the rheostat comprising a control member, a switch means having lost motion engagement with said control member and operating the switches, the switch in series responding to lost motion in one direction substantially to increase resistance in the circuit beyond that which normal adjustment of the rheostat accomplishes in adding resistance to the circuit and the switch in parallel responding to lost motion in the opposite direction substantially to decrease resistance in the circuit below that which normal adjustment of the rheostat accomplishes in subtracting resistance from the circuit, damping means, and a resilient connection between the switch member and the damping means.

4. In apparatus of the class described, a field member, a circuit for exciting said field member, a rheostat controlling circuit resistance to control the excitation by said circuit, make-and-break switches respectively in series and parallel with the rheostat, means for moving the rheostat comprising a control member, a switch means having lost motion engagement with said control member and operating the switches, the switch in series responding to lost motion in one direction substantially to increase resistance in the circuit beyond that which normal adjustment of the rheostat accomplishes in adding resistance to the circuit and the switch in parallel responding to lost motion in the opposite direction substantially to decrease resistance in the circuit below that which normal adjustment of the rheostat accomplishes in subtracting resistance from the circuit, resilient means between the control and switch members for taking up said lost-motion after an adjustment, damping means, and a resilient connection between the switch member and the damping means.

5. Eddy-current apparatus comprising an eddy-current member, a field member, a circuit for exciting the field member, a control rheostat providing different values of exciting current for different rheostat positions, and means responsive to initial movement of the rheostat to temporarily decrease the current value below that effected at a curent-decrease setting of the rheostat, or to temporarily increase the current value above that effected at a current-increase setting of the rheostat.

6. Eddy-current apparatus comprising a driving member, a driven member, one of said members consisting of an eddy-current member and the other a field member, a circuit for exciting the field member, a control rheostat providing different values of current in response to opposite rheostat movements, and means responsive to initial movement of the rheostat in current decrease direction temporarily to decrease the current value below that at the final current-decrease setting and means responsive to initial movement of the rheostat in current-increase direction temporarily to increase the current value above that effected at the final current-increase setting.

7. In an eddy-current clutch, a driven member, a magnetic field coil, means responsive to the speed of the driven member for decreasing excitation when speed incipiently increases, and for increasing excitation when speed incipiently decreases, and means responsive to initial movement of the speed-responsive member in a direction to increase current temporarily to apply substantially higher current, and responsive to initial movement of the speed-responsive member in a direction to decrease current temporarily to apply less current.

8. In an eddy-current clutch, a magnetic field member, a circuit for exciting said field member, a rheostat in said circuit, said rheostat having a position of predeterminately lower current flow and a position of predeterminately higher current, and means temporarily responsive to movement of the rheostat from the lower-current position to the higher-current position adapted to temporarily cause current flow through said circuit which is more than that flowing at the higher-current position, and means temporarily responsive to movement of the rheostat from the higher current position to the lower-current position for temporarily decreasing the flow of current to a value below that corresponding to the lower-current position.

9. In an eddy-current clutch, a magnetic driving member, a magnetic driven member, a magnetic field coil providing a magnetic field in one of said members for inducing eddy-currents in the other member, adjusting means responsive to the speed of the driven member for decreasing excitation of the coil when speed incipiently increases, and for increasing excitation when speed incipiently decreases, and means responsive to initial and incipient movement of the speed-responsive member in a direction to increase current, instantaneously and temporarily to apply a rush of substantially higher current, and responsive to initial movement of the speed-responsive member in a direction to decrease current instantaneously and temporarily to insert a very high resistance to flow of current, whereby temporary strong reorientations of magnetic properties are obtained in said magnetic members upon each incipient adjusting action of said adjusting means.

10. In an eddy-current clutch, a driving member, a driven member, at least one of said members being magnetic, a magnetic field coil producing a magnetic field interlinking said members, adjusting means for gradually increasing and decreasing excitation of the coil and automatic means adapted temporarily and suddenly greatly to exceed the value of the increase or decrease in said excitation, as the case may be, whereby complete reorientation of the magnetic properties of the magnetic member is effected in response to each adjustment.

11. In an eddy-current clutch, a driving member, a driven member, at least one of said members being magnetic, a magnetic field coil producing a magnetic field interlinking said members, adjusting means for gradually increasing and decreasing excitation of the coil respectively for incipiently increasing and decreasing the speed of the driven member, and automatic means responsive to incipient movement of the adjusting means adapted temporarily and suddenly greatly to exceed the value of the increase or decrease of the ultimate adjusted excitation, as the case may be, whereby magnetic reorientation of the magnetic member is completely enough affected in connection with each adjustment such that for a given adjusted position of the adjusting means, regardless of whether said position is approached with increase or decrease in coil excitation, the magnetic field is substantially of the same value.

MARTIN P. WINTHER.